(12) United States Patent
Suzuki et al.

(10) Patent No.: US 6,459,518 B1
(45) Date of Patent: Oct. 1, 2002

(54) OPTICAL TRANSMITTING APPARATUS

(75) Inventors: Masatoshi Suzuki, Kamifukuoka (JP); Noboru Edagawa, Kamifukuoka (JP); Hidenori Taga, Tokyo (JP); Shu Yamamoto, Kamifukuoka (JP)

(73) Assignees: KDD Corporation, Tokyo (JP); KDD Submarine Cable Systems, Inc., Tokyo (JP)

( * ) Notice: Subject to any disclaimer, the term of this patent is extended or adjusted under 35 U.S.C. 154(b) by 0 days.

(21) Appl. No.: 09/329,867

(22) Filed: Jun. 11, 1999

(30) Foreign Application Priority Data

Jun. 12, 1998 (JP) .......................................... 10-165558
Nov. 4, 1998 (JP) .......................................... 10-312706

(51) Int. Cl.⁷ ............................................. H04B 10/00
(52) U.S. Cl. ...................... 359/156; 359/158; 359/181; 359/183; 359/184; 359/188; 359/161; 359/124; 359/122; 359/133; 359/173
(58) Field of Search ................................. 359/156, 158, 359/181, 183, 188, 124, 133, 161, 173, 184, 122

(56) References Cited

U.S. PATENT DOCUMENTS

| 3,404,353 | A | * | 10/1968 | Harris et al. ................. 359/156 |
| 5,023,948 | A | * | 6/1991 | Smith ........................... 455/616 |
| 5,416,628 | A | * | 5/1995 | Betti et al. .................... 359/181 |
| 5,526,162 | A | * | 6/1996 | Bergano ....................... 359/181 |
| 5,706,084 | A | * | 1/1998 | Gutierrez ...................... 356/351 |

(List continued on next page.)

FOREIGN PATENT DOCUMENTS

| AU | B-12247/95 | 8/1995 |
| EP | 0 717 523 A2 | 6/1996 |
| EP | 0 717 523 A3 | 6/1996 |
| EP | 0717 524 A3 | 6/1996 |
| EP | 0 781 001 A1 | 6/1997 |
| EP | 0 782 282 A2 | 7/1997 |
| JP | 8-111662 | 4/1996 |
| JP | 8-237224 | 9/1996 |
| JP | 8-237225 | 9/1996 |
| JP | 9-197354 | 7/1997 |
| JP | 9-200128 | 7/1997 |
| JP | 9-233029 | 9/1997 |
| JP | 10-75216 | 3/1998 |

OTHER PUBLICATIONS

F. Heismann et al., "Electrooptic Polarization Scramblers for Optically Amplified Long–Haul Transmission Systems", IEEE Photonics Technology Letters, vol. 6, No. 9, Sep. 1994 (on order).

N. S. Bergano et al., "Bit–synchronous Polarization and Phase Modulation Scheme for Improving the Performance of Optical Amplifier Transmission Systems", Electronics Letters 4th, Jan. 1996, vol. 32, No. 1 (on order).

(List continued on next page.)

*Primary Examiner*—Leslie Pascal
*Assistant Examiner*—Hanh Phan
(74) *Attorney, Agent, or Firm*—Christie, Parker & Hale, LLP

(57) ABSTRACT

A laser diode continuously laser-oscillates and its output light is applied to an optical modulator. A pulse driver drives the optical modulator according to a data to be transmitted. A phase modulator is driven by a phase modulator driver and phase-modulates the output from the optical modulator. The polarization direction of the incident light of the phase modulator is set so that the modulation efficiency of the phase modulator becomes the maximum. The output light of the phase modulator inputs a birefringent medium and applies to an optical transmission line after transmitting the birefringent medium. The principal axis of the birefringent medium is disposed so as to be at an angle of 45° to the polarization direction of the output light from the phase modulator.

23 Claims, 10 Drawing Sheets

U.S. PATENT DOCUMENTS 5,872,647 A * 2/1999 Taga et al. ................... 359/184
5,910,852 A * 6/1999 Fontana et al. ............. 359/156
5,946,119 A * 8/1999 Bergano et al. ............. 359/124
5,978,116 A * 11/1999 Wu et al. .................... 359/124
6,005,702 A * 12/1999 Suzuki et al. ............... 359/183
6,008,922 A * 12/1999 Gautheron et al. ......... 359/156
6,055,081 A * 4/2000 Koyano et al. ............. 359/161
6,134,033 A * 10/2000 Bergano et al. ............. 359/122

OTHER PUBLICATIONS

F. Heismann et al., "Electroopic Polarization Scramblers for Optically Amplified Long–Haul Transmission Systems", IEEE Photonics Technology Letters, vol. 6, No. 9, Sep. 1994.

N. S. Bergano et al., "Bit–synchronous Polarization and Phase Modulation Scheme for Improving the Performance of Optical Amplifier Transmission Systems", Electronics Letters 4th, Jan. 1996, vol. 32, No. 1.

* cited by examiner

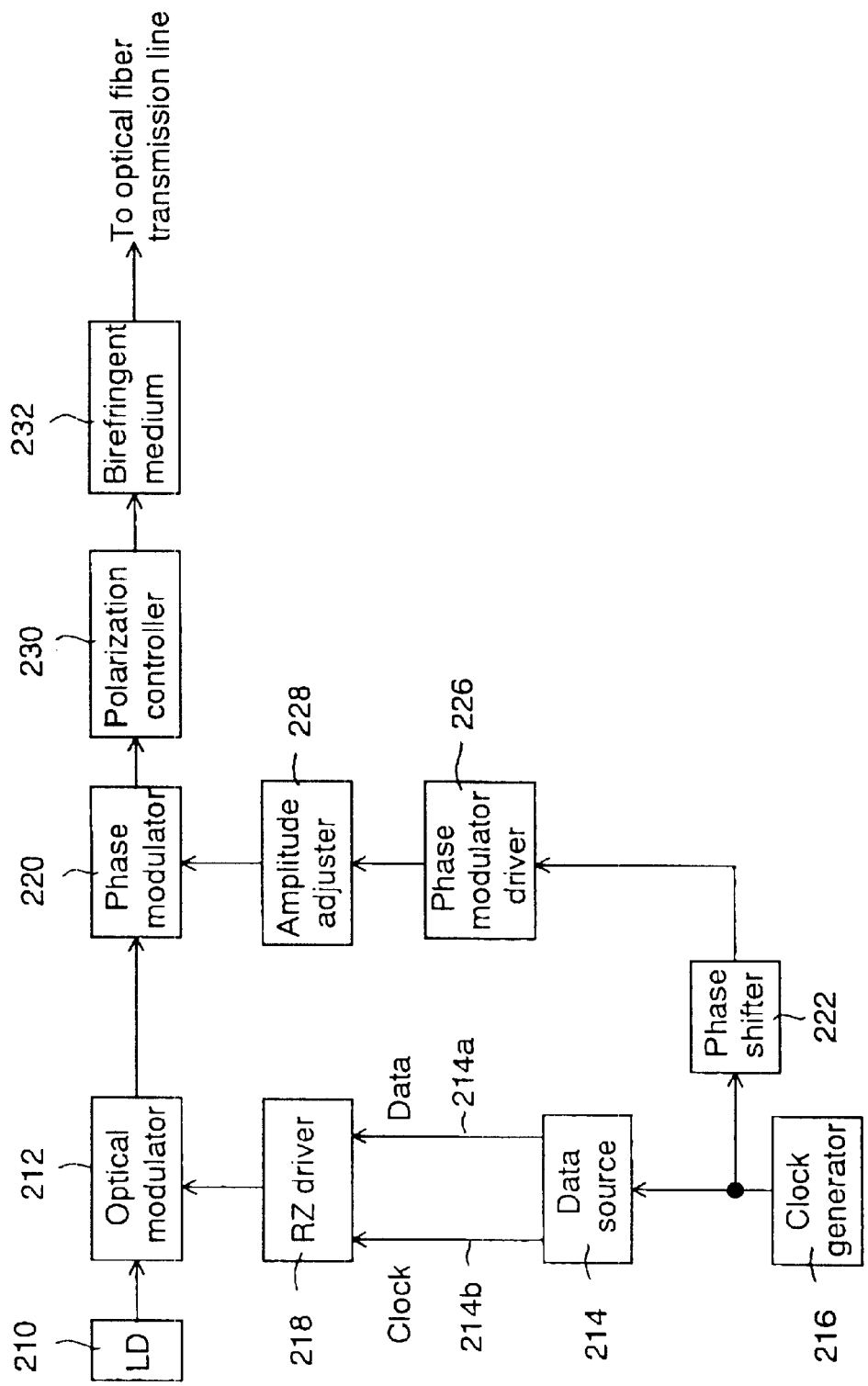

Fig. 8(a) Waveform of RZ optical signal
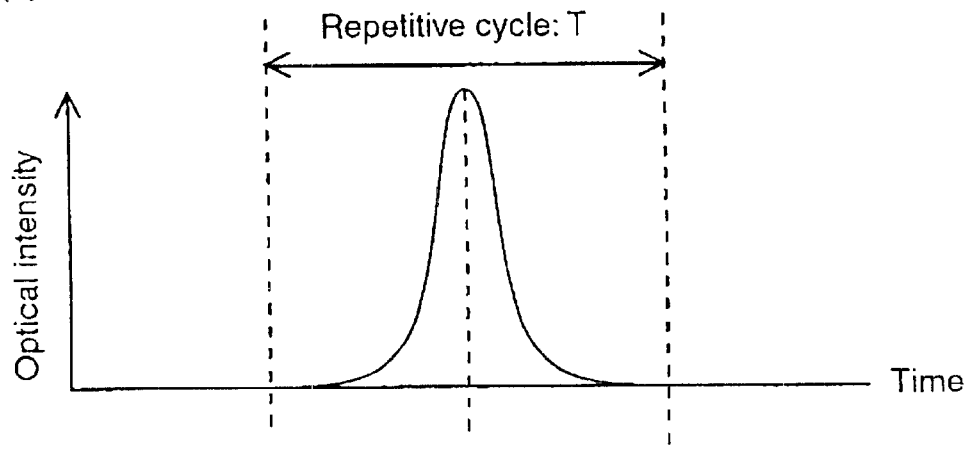
Fig. 8(b) Frequency deviation due to phase modulation
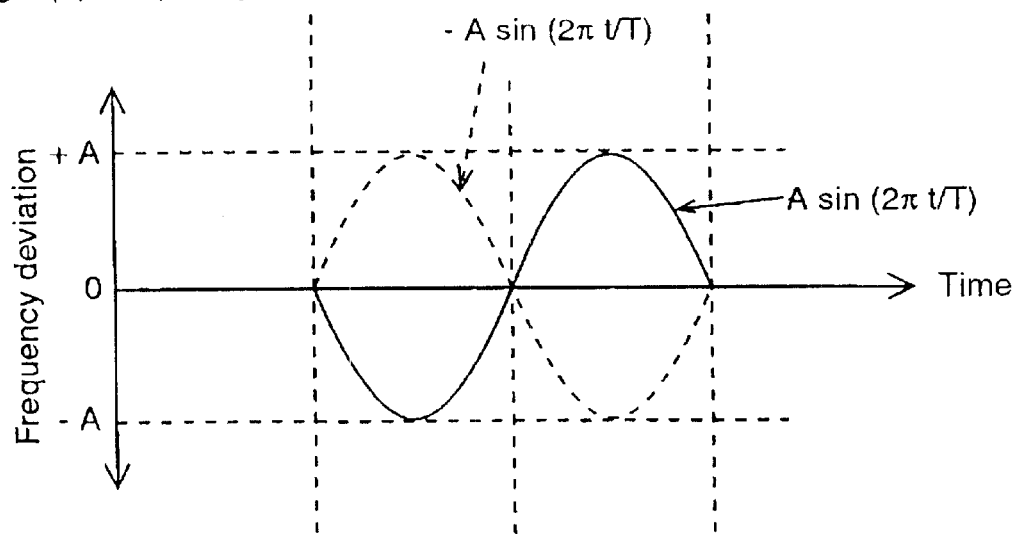
Fig. 8(c) A waveform after transmission through birefringent medium
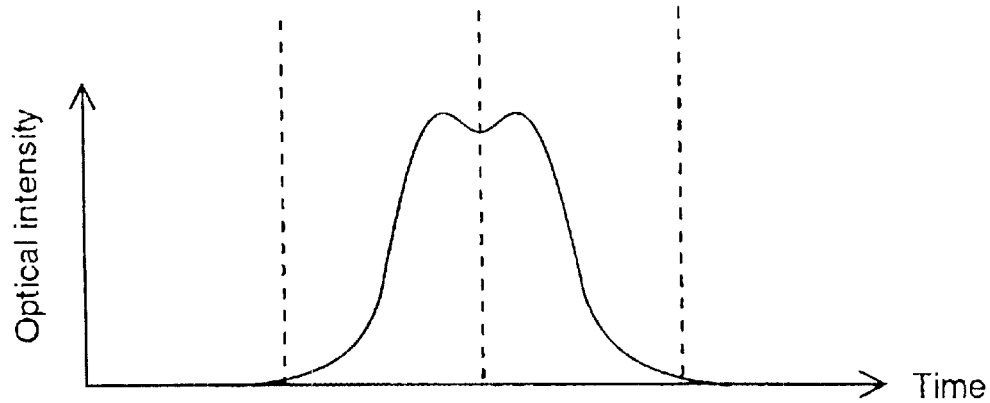

OPTICAL TRANSMITTING APPARATUS

FIELD OF THE INVENTION

This invention relates to an optical transmitting apparatus, and more specifically, to an optical transmitting apparatus for modulating a phase and a polarization of a signal light in advance in an optical transmitter of a long distance optical transmission system.

BACKGROUND OF THE INVENTION

In general, in a long distance optical transmission system, especially in a long distance wavelength division multiplexing optical transmission system, it has been necessary to modulate a phase of a signal light pulse for improving their transmission characteristics and to scramble polarization of the pulse for suppressing polarization dependence of the transmission system before transmitting the pulse to the transmission line. See, for instance, F. Heismann et al. "Electrooptic Polarization Scramblers for Optically Amplified Long-Haul Transmission Systems", IEEE Photonics Technology Letters, vol. 6, No. 9, September 1994 and N. S. Bergano et al. "Bit-synchronous polarization and phase modulation scheme for improving the performance of optical amplifier transmission systems", Electronics Letters $4^{th}$ January 1996, vol. 32, No. 1.

Therefore, in a conventional optical transmitter, an optical intensity modulator or a data modulator intensity-modulates a CW laser light into NRZ pulses or RZ pulses in accordance with a data to be transmitted, and then a polarization scrambler simultaneously modulates the phase and polarization of the pulse. However, as the phase modulation volume achieved by the polarization scrambler is equal to the average amount of the phase modulation of the principal axis and the secondary axis, it requires voltage higher (approximately 1.4 times higher) than that used in an ordinary phase modulator. In order to provide the optimum phase modulation, an extra phase modulator should be disposed separately from a polarization modulator.

Although a lithium niobate crystal is generally employed for the phase modulator and the polarization modulator or polarization scrambler, its usage is different from each other. When the lithium niobate crystal is operated as the phase modulator, a polarization of incident light is adjusted to the direction of the maximum modulation efficiency. On the other hand, when it is operated as the polarization modulator or polarization scrambler, the polarization direction of incident light is set at an angle of 45° to that of the highest modulation efficiency. Although the function of the polarization scrambler is basically to rotate the polarization in an optical pulse, it secondarily modulates the phase.

The phase modulation and the polarization modulation in the optical transmitting apparatus are referred in Japanese Patent Open Disclosure Gazettes No. 8-111662, 8-237224, 8-237225, 9-197354, 9-200128, 9-233029 and 10-75216. Especially, inventions described in the Japanese Patent Open Disclosure Gazettes No. 8-111662, 8-237224, 8-237225 and 9-197354 propose to make the residual degree of polarization substantially zero and the objects of the inventions in the other Gazettes are fundamentally the same. In the meanwhile, the degree of polarization is generally defined as the ratio of optical power of a polarization component to all optical power. This specification also adopts this definition.

When the extra phase modulator is disposed separately, the apparatus has to comprise the three modulators of the data modulator, phase modulator and polarization modulator. Thus, the apparatus becomes large-sized as well as high-priced causing a rise of trouble in production and maintenance.

As described above, in a conventional optical transmitting apparatus combining the phase modulator and the polarization modulator, the polarization is scrambled so that the degree of residual polarization or the average degree of polarization becomes zero. However, it has been proved from the subsequent research that to make the residual polarization zero does not necessarily improve the transmission characteristics in an RZ transmission.

SUMMARY OF THE INVENTION

An object of the invention is to provide an optical transmitting apparatus for effectively modulating a phase and a polarization of a signal light.

Another object of the invention is to provide an optical transmitting apparatus to be produced at lower price and smaller size compared with a conventional apparatus.

A further object of the invention is to provide an optical transmitting apparatus capable of obtaining the better transmission characteristics in an RZ transmission.

In this invention, a phase modulator modulates a phase of a signal light pulsated according to the data to be transmitted and outputs it to a birefringent material at an angle of 45° to the principal axis.

Since the birefringent material changes the polarization of the input signal according to its phase, the obtained result becomes substantially the same with that obtained by the polarization scrambling. As the phase modulator is used at the maximum modulation efficiency, the phase modulation can be carried out more efficiently. It is highly reliable because no driving source is required for the polarization modulation and thus the polarization modulation also can be done efficiently. Therefore, it is possible to make the phase modulation and the polarization modulation more efficient and also independently, and, as a result, a highly reliable optical transmitting apparatus can be realized.

The birefringence material comprises for example a polarization-preserving fiber and it is applicable either way to connect directly with an output of the phase modulator or to connect with the birefringence material through a polarization rotator.

Also, this invention uses a travelling wave type phase modulator wherein the signal light phase-modulated at the phase modulator is rotated so that its polarization direction becomes at an angle of 45° to the principal axis and sending it back to the phase modulator again. By this structure, the phase modulator can be used for both phase modulation and polarization modulation. Consequently, a low-priced optical transmitting apparatus can be realized and also its configuration can be simplified.

In order to pick up the phase-modulated and polarization-modulated signal light, for example an optical circulator should be employed. The optical circulator can introduce the signal light to be modulated into the phase modulator and efficiently extract the phase-modulated and polarization-modulated signal light output from the phase modulator toward the outside. The phase modulator comprises for example a $LiNbO_3$ crystal.

As the phase-modulated signal lights of different wavelengths are polarization-combined and sen t to the birefringence material, the multiple wavelengths can be polarization-modulated spontaneously. The number of birefringent mediums for obtaining the wavelength division multiplexed signal light can be reduced.

If the polarization directions of the signal lights of adjacent wavelengths are set so as to meet orthogonally, the number of the required birefringent mediums can be reduced and also the number of dispersion compensators can be reduced by half when the dispersion compensation is needed. Those reductions contribute to miniaturize the whole structure.

The optical transmitting apparatus according to the invention also comprises a signal light generator for generating an RZ pulse light in accordance with a data to be transmitted; a phase modulator for phase-modulating the RZ pulse signal light output from the signal light generator by synchronizing with the RZ pulse signal light; and a polarization modulator for polarization-modulating the output light from the phase modulator, wherein the degree of residual polarization in the output from the polarization modulator is set to a non-zero finite value. Consequently, satisfactory transmission characteristics can be obtained in the RZ optical transmission system without such excess phase modulation as setting the degree of the residual polarization to zero. The degree of the residual polarization in the output from the polarization modulator is preferably from 20% to 70%.

The optical transmitting apparatus according to the invention also comprises a data output means for outputting a signal indicating a data to be transmitted; an RZ light source for generating an RZ pulse signal light according to the output data from the data output means; a phase adjuster for adjusting a phase of a clock substantially synchronized with the output data from the data output means; a phase modulator for modulating a phase of the output light from the RZ light source; and a polarization modulator for modulating a polarization of the output light from the phase modulator according to the phase of the output light from the phase modulator.

Because the phase adjuster is disposed, the degree of polarization modulation, namely the degree of the residual modulation can be determined independently from the degree of phase modulation.

The polarization modulator comprises for example a birefringent material, or comprises a polarization controller for controlling a polarization of the output light from the phase modulator and a birefringent material into which the output light from the polarization controller inputs at a predetermined angle to the principal axis.

If the degree of residual polarization in the output light from the polarization modulator is set to non-zero, for example from 20% to 70%, the satisfactory transmission characteristics can be obtained without the excess phase modulation in the RZ optical transmission.

The phase modulation timing of the phase modulator should be set so that the direction of frequency deviation inverts around the peak of the input RZ pulse. Accordingly, it becomes capable of giving the appropriate polarization modulation and also capable of optimizing the degree of phase modulation.

BRIEF DESCRIPTION OF THE DRAWINGS

FIG. 7 shows a schematic block diagram of an additional embodiment of the invention;

FIG. 8 (*a*) shows a waveform of the RZ optical pulse in the embodiment shown in FIG. 7;

FIG. 8(*b*) shows the frequency deviation at a phase modulator 220;

FIG. 8(*c*) shows an example of optical pulse distortion by a birefringent medium 232;

DESCRIPTION OF THE PREFERRED EMBODIMENTS

Embodiments of the invention are explained below in detail with reference to the drawings.

Figure 1:
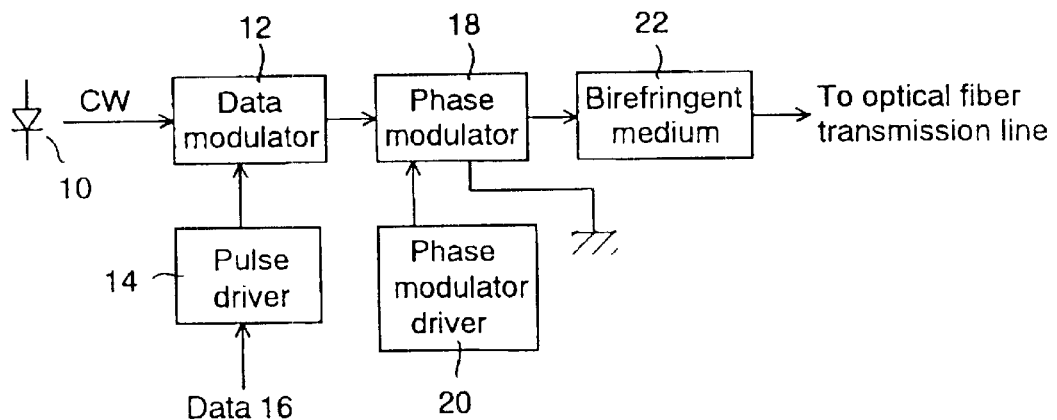
FIG. 1 shows a schematic block diagram of a first embodiment of the phase/polarization modulator according to the invention.

FIG. 1 shows a schematic block diagram of a first embodiment of the invention. Numeral 10 denotes a laser diode continuously laser-oscillating and generating laser light to carry signal. An output light from the laser diode 10 is applied to an optical modulator 12. The optical modulator 12 comprises for example an electroabsorption optical modulator. A pulse driver 14 drives the optical modulator 12 according to a to-be-transmitted data 16. For example, the optical modulator 12 transmits the output light from the laser diode 10 at no loss or low loss within the duration of a driving pulse and absorbs it during a period of absence of the driving pulse. The reverse order is also applicable. With the above described configuration, an NRZ or RZ optical pulse according to the to be transmitted date 16 can be formed.

A phase modulator 18 is driven by a phase modulator driver 20 and phase-modulates the output from the optical modulator 12. The polarization direction of an incident light to the phase modulator 18 is set so that the modulation efficiency of the phase modulator 18 becomes the maximum. Consequently, the phase modulator 18 requires only low voltage as the driving voltage. The phase modulator 18 comprises a crystal of LiNbO$_3$.

The output light of the phase modulator 18 enters and transmits a birefringent medium 22 and then applies to an optical fiber transmission line. The principal axis of the birefringent medium 22 is disposed so as to be at an angle of 45° to the polarization direction of the output light from the phase modulator 18. The birefringent medium 22 comprises for instance a 10-m polarization-preserving fiber of 20 ps polarization mode dispersion. A LiNbO$_3$ waveguide (it can be a polarization scrambler in an OFF-state) of 20 ps polarization mode dispersion also can be used as the birefringent medium 22. The polarization state of the optical pulse, which spectrum is widened due to the phase modulation, changes in such order of circle polarization, oval polarization, linear polarization, oval polarization and circle polarization according to the phase of the light in the optical pulse. As a result, its state becomes equal to that obtained by polarization scramble and thus reduces the deterioration of transmission characteristics caused by the polarization dependence (such as polarization hole burning) of an optical amplifying repeating system.

In this embodiment, since the phase modulator 18 can be used with its modulation efficiency maximum, even a low driving voltage can be sufficient. For instance, a result obtained using the formula (4) in the paper by F. Heismann et al. shows that, in this embodiment, the optimum volume of phase modulation, which is the most important factor to determine the long distance transmission characteristics, can be obtained with approximately 70% of driving voltage compared with the case using a polarization scrambler alone.

Figure 2:
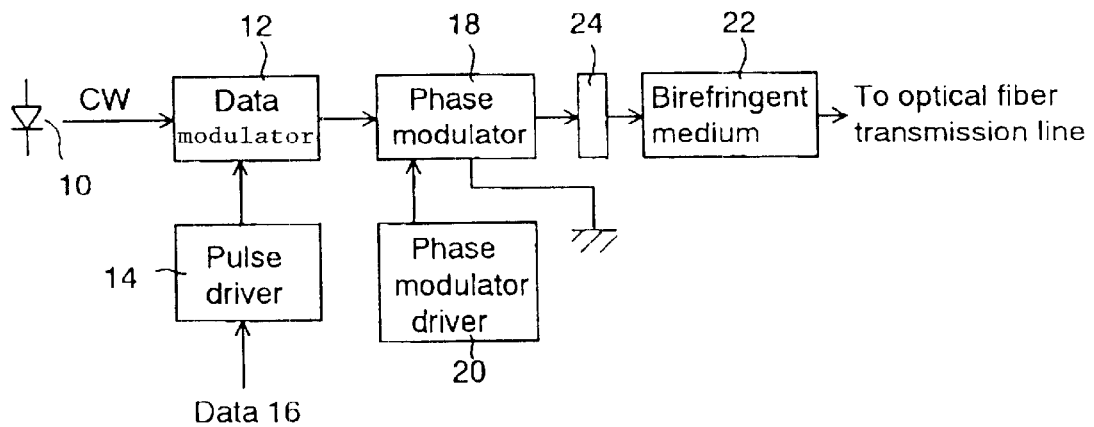
FIG. 2 shows a schematic block diagram of a second embodiment of the phase/polarization modulator according to the invention.

A crystal of $LiNbO_3$ also can be used as the birefringent medium 22. The crystal of $LiNbO_3$ as the birefringent medium 22 can be physically disposed at an angle of 45° to the phase modulator 18. However, it is obvious that a Faraday rotator 24 with a rotation angle of 45° can be disposed between the phase modulator 18 and the birefringent medium 22 as shown in FIG. 2.

Figure 3:
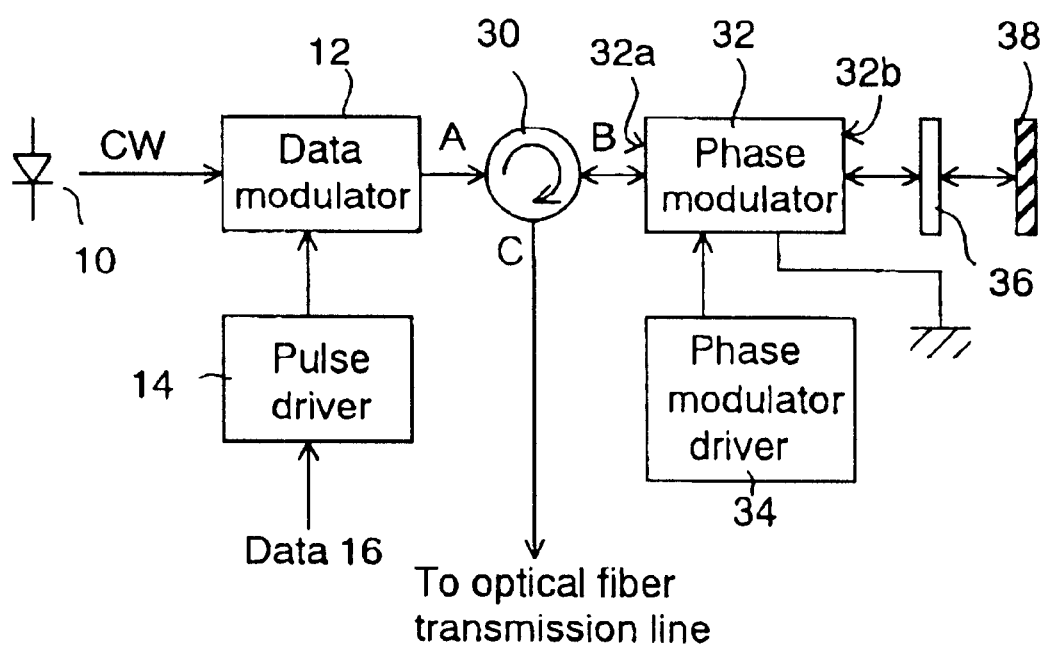
FIG. 3 shows a schematic block diagram of a third embodiment of the phase/polarization modulator according to the invention.

FIG. 3 shows a schematic block diagram of a third embodiment of the invention. Identical elements are labeled with reference numerals common to those in FIG. 1.

The optical pulse output from the optical modulator 12 enters a port A of an optical circulator 30. The optical circulator 30 is an optical element for outputting the input light via the port A from a port B and outputting the input light via the port B from a port C. The output light through the port B of the optical circulator 30, namely the output light of the optical modulator 12 enters an end face 32a of a phase modulator 32 comprising a crystal of $LiNbO_3$. The phase modulator 32 should be disposed so as to have the optimum modulation efficiency toward the output light from the port B of the optical circulator 30. A phase modulator driving circuit 34 drives the phase modulator 32.

The light, which is transmitted the phase modulator 32 and output from its end face 32b, transmits a Faraday rotator 36 with a rotation angle of 22.5°, is totally reflected by a total reflection mirror 38, transmits the Faraday rotator 36 again, and then enters the end face 32b of the phase modulator 32. As transmitting the Faraday rotator 36 twice, the output light from the end face 32b of the phase modulator 32 reenters the end face 32b rotating at an angle of 45°.

Not only the crystal of $LiNbO_3$, a phase modulator is generally a traveling wave type and a phase of light is modulated when propagation directions of the light and electricity are the same. Therefore, in the phase modulator 32, the light is phase-modulated when transmitting from the end face 32a to the end face 32b and, conversely, not phase-modulated when transmitting from the end face 32b to the end face 32a. Since the light enters the end face 32b is inclined by the Faraday rotator 36 at an angle of 45° to the principal axis of the phase modulator 32, the phase modulator 32 operates, similar to the birefringent medium 22 in FIG. 1, to change the polarization state of the light propagating from the end face 32b to the end face 32a according to its phase.

The light output from the end face 32a of the phase modulator 32 inputs the port B of the optical circulator 30 and outputs the optical fiber transmission line through the port C.

In the embodiment shown in FIG. 3, a single phase modulator is used for both going and returning. The phase modulator operates as a phase modulator when the light propagates in one direction, and operates as a polarization modulator when the light propagates in the other direction. Accordingly, the use of an expensive crystal can be avoided although it requires the use of the optical circulator 30.

Figure 4:
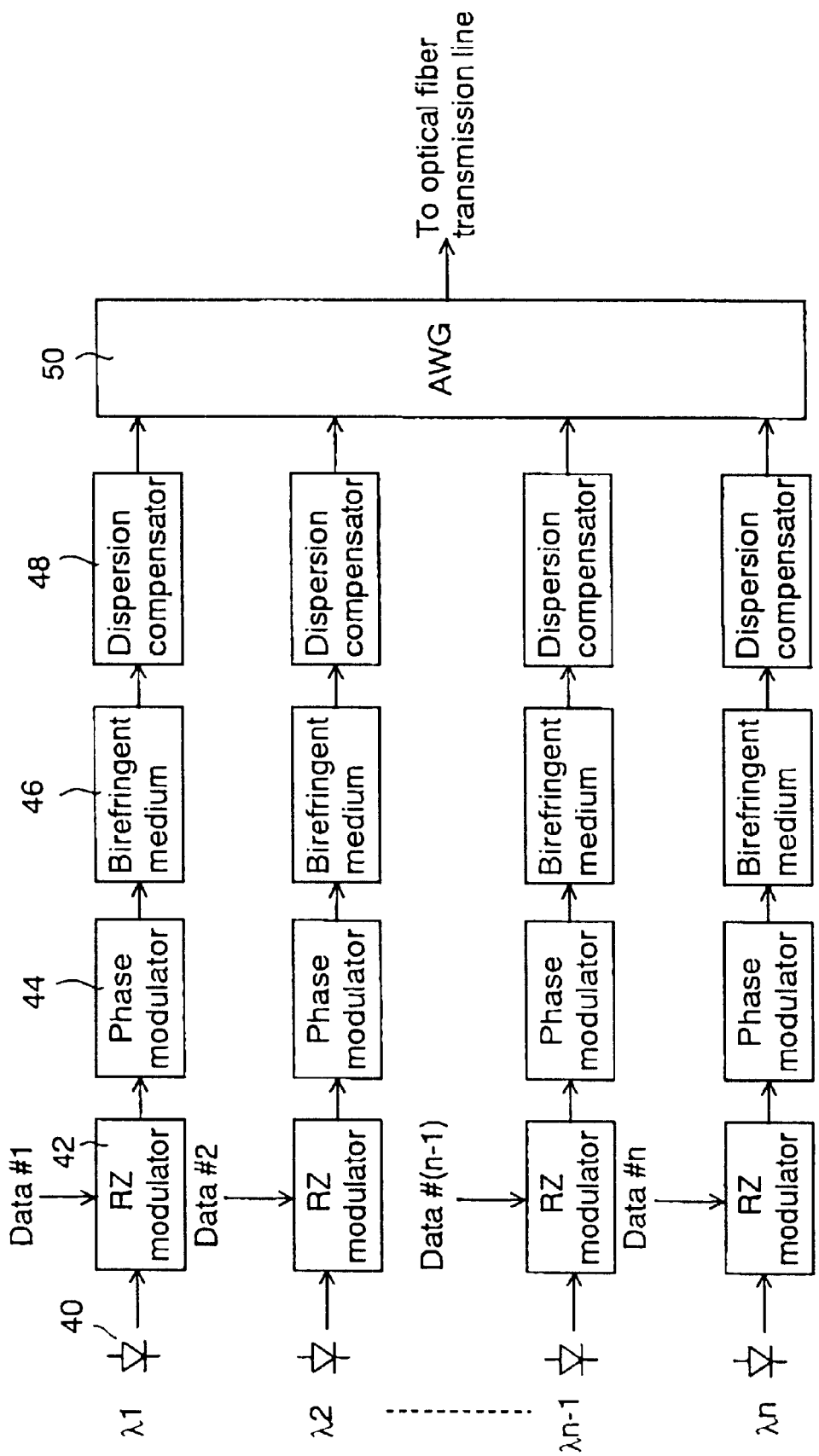
FIG. 4 shows a schematic block diagram of an optical transmitter employing the embodiment of the phase/polarization modulator shown in FIG. 1.

FIG. 4 shows a schematic block diagram in which the embodiment shown in FIG. 1 is applied to an optical transmitting apparatus for outputting a wavelength division multiplexing signal light. In FIG. 4, n wavelengths of λ1~λn are used. Disposed for each of wavelengths λ1~λn are a laser diode 40 laser-oscillating at each of wavelengths λ1~λn, an RZ modulator for RZ-modulating an output light from the laser diode 40 with data #1~#n to be transmitted, a phase modulator 44 for phase-modulating an output light from the RZ modulator 42 under synchronization with the data #1~#n, a birefringent medium 46 for polarization-scrambling an output light from the phase modulator 44, and a dispersion compensator 48 for preproviding a chromatic dispersion according to the each wavelength. The alternative to the part consisted of the laser diode 40 and the RZ modulator 42 is an optical source integrating a DFB laser and an absorption type optical modulator. Also, an optical amplifier for compensating loss is sometimes disposed at an appropriate part as occasion demands.

The configuration and function of the part consisted of the laser diode 40, the RZ modulator 42, the phase modulator 44 and the birefringent medium 46 are practically the same with the embodiment shown in FIG. 1. The dispersion compensator 48 imparts chromatic dispersion suitable for each wavelength to the signal light from the birefringent medium 46 in advance and applies the signal light to a multiplexer 50 comprised of an arrayed waveguide grating. The multiplexer 50 wavelength-division-multiplexes signal lights having each of wavelengths λ1~λn from the dispersion compensator 48 and outputs them toward an optical fiber transmission line.

A transmission test of 9000 km is performed with a wavelength interval of 0.8 nm, the number of wavelengths of 16 (1544 nm~1556 nm), a data modulation rate of 10.66 Gb/s, a driving frequency of the phase modulator 44 of 10.66 GHz, and a 10 m polarization-preserving fiber with its polarization mode dispersion of 20 ps as the birefringent medium 46. The result shows that the average Q factor of reception characteristics after the 9000-km transmission is equal to or slightly inferior to the optimum state obtained when a phase modulation and a polarization scrambling are employed.

Figure 5:
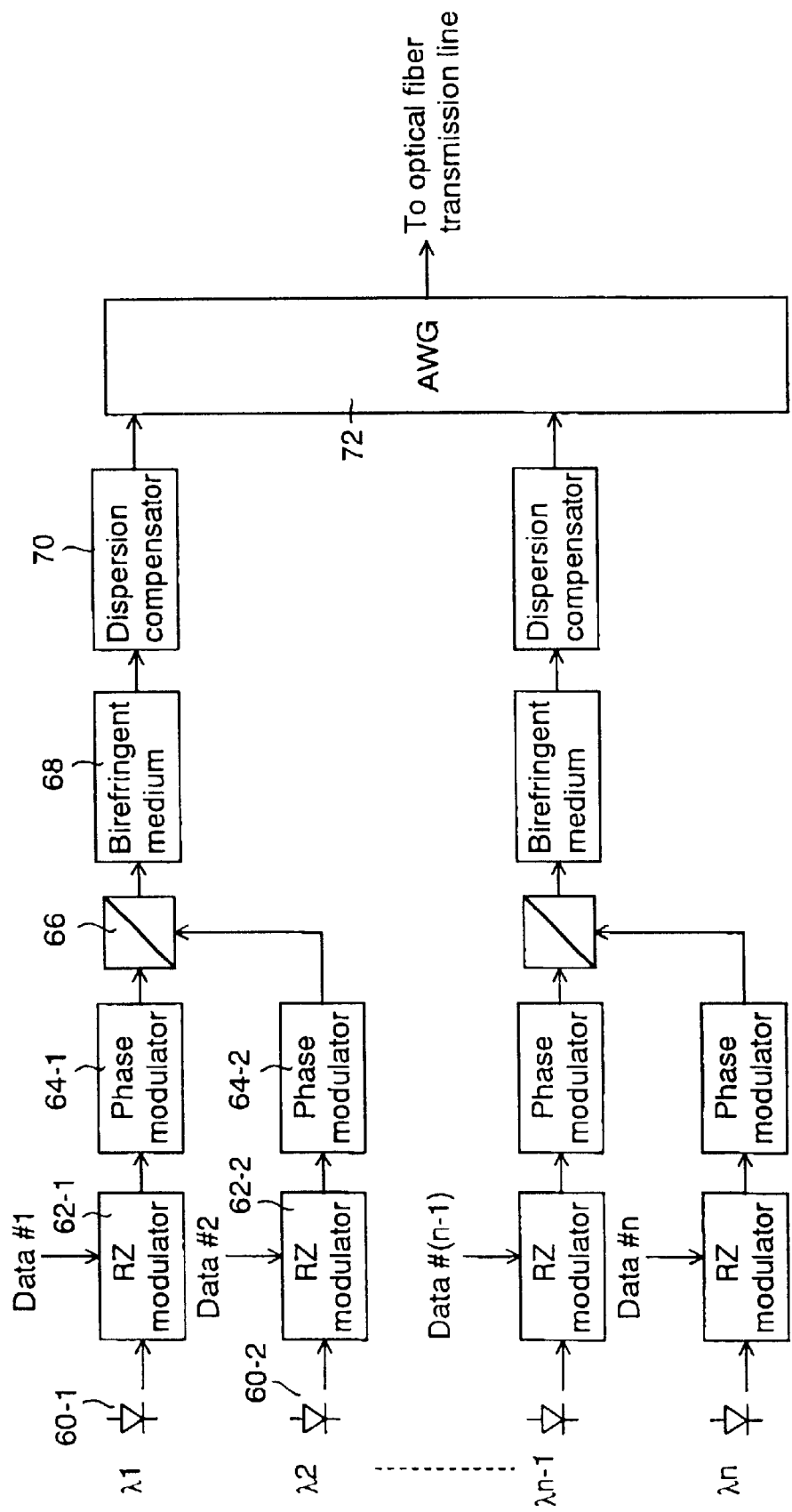
FIG. 5 shows a schematic block diagram of a modified structure of the embodiment of the optical transmitter shown in FIG. 4.

The configuration shown in FIG. 4 can be modified so that two adjacent wavelengths share a single birefringent medium. A schematic block diagram of the modified embodiment is shown in FIG. 5. First of all, the configuration and actuation of the part relating to the wavelengths λ1 and λ2 will be explained. A laser diode 60-1 laser-oscillates at the wavelength λ1 and a laser diode 60-2 laser-oscillates at the wavelength λ2. An RZ modulator 62-1 RZ-modulates an output light from the laser diode 60-1 with a data #1 to be transmitted and an RZ modulator 62-2 RZ-modulates an output light from the laser diode 60-2 with a data #2 to be transmitted. A phase modulator 64-1 phase-modulates an output light from the RZ modulator 62-1 under synchronization with the data #1 and a phase modulator 64-2 phase-modulates an output light from the RZ modulator 62-2 under synchronization with the data #2.

The output lights of the phase modulators 64-1 and 64-2 enter a polarization beam splitter 66 in an orthogonal polarization state and then input a birefringent medium 68 after being multiplexed at the polarization beam splitter 66. By employing a polarization-preserving fiber at the output side of the multiplexed light of the polarization beam splitter 66, the polarization beam splitter 66 and the birefringent medium 68 can become an integral module. The birefringent medium 68 is disposed so that the polarization directions of both output lights from the phase modulators 64-1 and 64-2 become at an angle of 45° to the principal axis of the birefringent medium 68. Since the wavelengths of the output lights from the phase modulator 64-1 and 64-2 are different, they do not interfere each other on the birefringent medium 68. The birefringent medium 68 modifies the polarization states of the output lights from the phase modulators 64-1~64-2 individually according to each phase as explained in the embodiment shown in FIG. 1. The lights transmitted the birefringent medium 68 enter a dispersion compensator 70. The amount of chromatic dispersion of the dispersion compensator 70 is set to the average of the amount of chromatic dispersion to be needed for the wavelength λ1 and the amount of chromatic dispersion to be needed for the wavelength λ2.

The lights transmitted the dispersion compensator 70 enter an arrayed waveguide grating 72 acting as a wavelength division multiplexing element. The input lights of the arrayed waveguide grating 72 are wavelength-division-multiplexed with the other signal lights of wavelengths λ3~λn and output toward the optical fiber transmission line.

The configuration and actuation of the other wavelengths λ3~λn are identical to those of the wavelengths λ1 and λ2.

In the embodiment shown in FIG. 5, in addition to the effects in the embodiment shown in FIG. 4, deterioration of the transmission characteristics due to the four-photon mixing during transmission can be reduced because the polarization of at least one of two wavelengths adjacent to a wavelength crosses orthogonally with the polarization of the wavelength. The number of the dispersion compensators 70 is reduced into half and therefore the miniaturization of the real unit can be realized. For setting the signal light power of the two wavelengths to be polarization-combined at the polarization beam splitter 66 individually, for example, respective optical amplifiers should be disposed between the phase modulators 64-1, 64-2 and the polarization beam splitter 66.

The result obtained from the 9000-km transmission in practice indicates that the reception characteristics are identical to that of a conventional structure to use the phase modulation and the polarization scrambling together.

Figure 6:
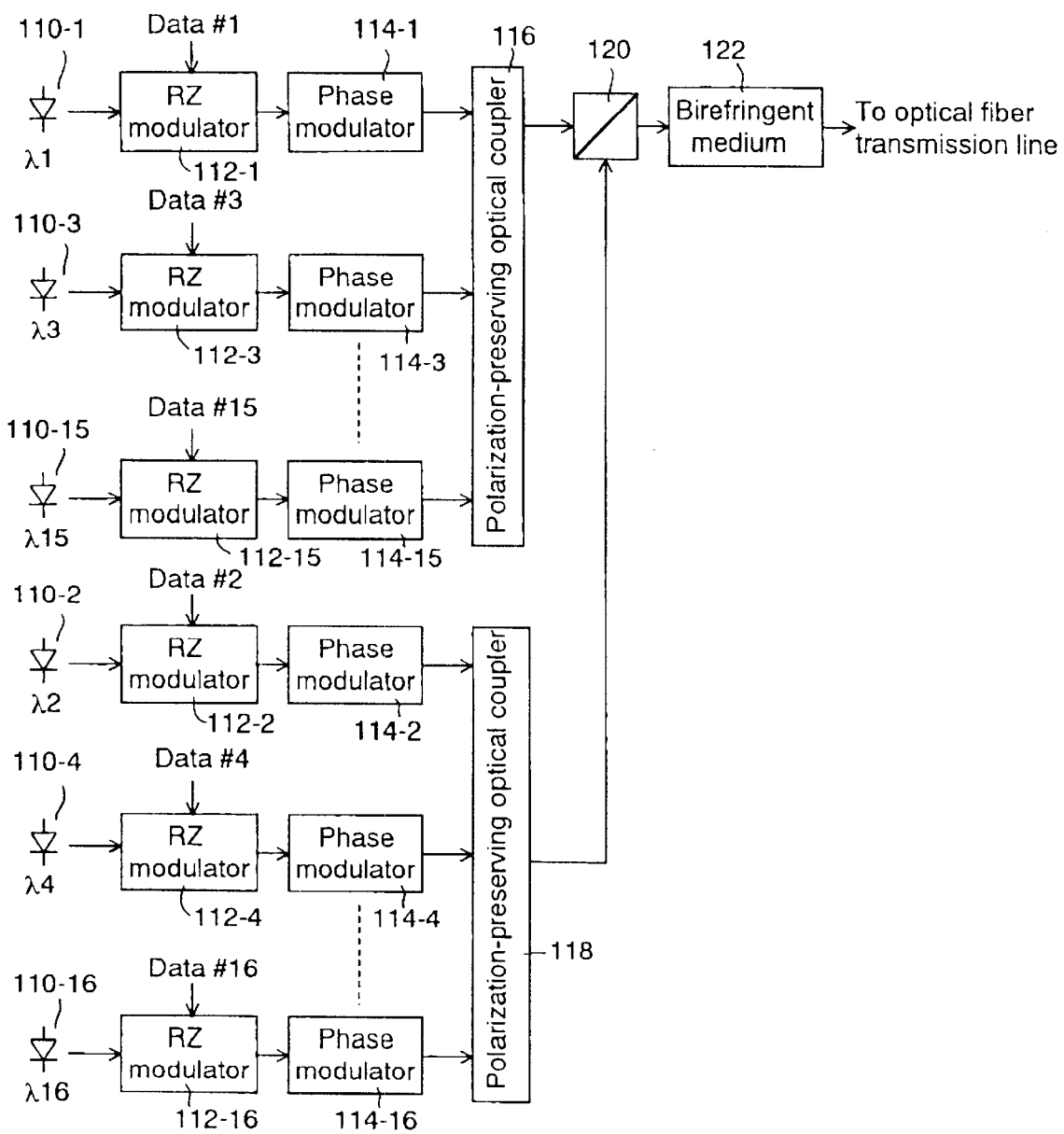
FIG. 6 shows a schematic block diagram of an another embodiment of the optical transmitter.

In the transmission such as several thousands km transmission that does not need chromatic dispersion compensation, as the chromatic dispersion compensators become unnecessary, the configuration can be more simplified. FIG. 6 shows a schematic block diagram of the embodiment. The embodiment shown in FIG. 6 is on the assumption to multiplex and transmit 16 wavelengths.

Numerals 110-1~110-16 denote laser diodes continuously laser-oscillating at wavelengths λ1~λ16 respectively. RZ modulators 112-1~112-16 RZ-modulate each output lights of the laser diodes 110-1~110-16 respectively. The output lights of the RZ modulators 112-1~112-16 enter the corresponding phase modulators 114-1~114-16 at the optimum condition of phase modulation. The phase modulators 114-1~114-16, similar to the phase modulator 18, phase-modulate the output lights of the respective RZ modulators 112-1~112-16.

In this embodiment, the output lights of the odd numbered phase modulators of 114-1, 114-3 . . . 114-15 and the output lights of the even numbered phase modulators of 114-2, 114-4 . . . 114-16 are respectively collected into two groups. That is, the respective output lights of the odd numbered phase modulators 114-1, 114-3 . . . 114-15 enter the polarization-preserving optical coupler 116 in the same polarization direction and combined into one. Similarly, the respective output lights of the even numbered phase modulators 114-2, 114-4 . . . 114-16 enter the polarization-preserving optical coupler 118 in the same polarization direction and then combined into one.

The signal lights combined by the polarization-preserving optical couplers 116 and 118 enter a polarization beam splitter 120 in the mutually orthogonal polarization directions. The polarization beam splitter 120 combines both input lights in preserving the polarization state. The output light of the polarization beam splitter 120 enters a birefringent medium 122 at an angle of 45° inclined to its principal axis. The polarizations of the signal lights of the respective wavelengths, similar to the embodiment shown in FIG. 1, are modulated while propagating the birefringent medium 122. The lights transmitted the birefringent medium 122 are output toward the optical fiber transmission line.

In the embodiment shown in FIG. 6, the polarization directions of the signal lights being wavelength division multiplexed lights and also having mutually adjacent wavelengths are different, namely as the polarization of the adjacent channels is orthogonal, the influence of four photon mixing during the transmission can be limited to the minimum.

In each of the above embodiments, the degree of polarization is determined automatically according to the degree of phase modulation. Principally, the degrees of phase modulation and polarization affect the transmission characteristics independently and thus it is preferable to determine or adjust those degrees individually. Also, the best degree of polarization is not necessarily the lowest in the RZ transmission. In some cases, it is preferable to select the finite value.

An embodiment for determining the degrees of phase modulation and polarization separately will be explained below. FIG. 7 shows a schematic block diagram of the embodiment. Numeral 210 denotes a laser diode generating a laser light to carry a signal and continuously laser-oscillating. An output from the laser diode 210 is applied to a optical modulator 212. The optical modulator 212 comprises for example an electroabsorption optical modulator. A data source 214 supplies a data 214a to be transmitted and a clock 214b to an RZ driving circuit 218 according to a clock from a clock generator 216. The RZ driver 218 drives the optical modulator 212 according to the data 214a and clock 214b from the data source 214 and makes the optical modulator 212 form RZ optical pulses for carrying the data 214a to the optical modulator 212. That is, the output light of the optical modulator 212 comprises the RZ optical pulses for carrying the data 214a to be transmitted.

The output light of the optical modulator 212 is applied to a phase modulator 220. A clock generated by a clock generator 216 is applied to a phase modulator driver 226 after its phase is shifted appropriately by a phase shifter 222. The phase modulator driver 226 generates a driving signal (a sine wave) for the phase modulator 220 according to the clock from the phase shifter 222 and outputs the generated driving signal to a amplitude adjuster 228. Assuming that a repetitive period of the RZ optical pulses output from the optical modulator 212 is T, the phase modulator driver 226 generates a sine wave with angular frequency of 2π/T as the driving signal. The amplitude adjuster 228 adjusts the amplitude of the driving signal from the phase modulator driver 226 and applies it to the phase modulator. That is, the phase modulator 220 phase-modulates the RZ optical pulse by synchronizing it with its bit.

FIG. 8(*a*) shows the RZ pulse output from the optical modulator 212 and FIG. 8 (*b*) shows the waveform of the frequency deviation at the phase modulator 220. The ordinate axis of FIG. 8(*a*) indicates optical intensity and the abscissa axis indicates time, and the ordinate axis of FIG. 8(*b*) indicates the frequency deviation due to the phase modulation by the phase modulator 220 and the abscissa axis indicates time respectively. Although the frequency deviation at the phase modulator 220 is A sin ($2\pi$/T), it is needless to say that −A sin ($2\pi$/T) is also usable. It is determined by a parameter of the transmission system to select a + (plus) or a − (minus) as a frequency deviation sign. Generally, it is common to apply the + (plus) on the longer wavelength side compared to the wavelength of system zero dispersion and applies the − (minus) on the shorter wavelength side compared to the wavelength of system zero dispersion. However, in some cases, the reverse relation should be used depending on the amount of residual dispersion compensation of the receiver side. Therefore, it is preferable that the frequency deviation sign is determined by the signal wavelength and the amount of residual dispersion in the transmission system and moreover it is preferable to be able to select after the completion of construction. Because the amplitude adjuster 228 adjusts the amplitude of the driving signal at an appropriate level, the amplitude A of frequency deviation can be adjusted as shown in FIG. 8(*b*).

The phase shifter 222 adjusts the phase of the clock from the clock generator 216 so that the peak of the RZ pulse output from the optical modulator 212 approximately coincides with the point (t=0) in which the phase of a sine wave driving signal becomes zero. Namely, the amount of phase adjusting of the phase shifter 222 is adjusted so as to reverse the sign of the frequency deviation by the phase modulator of the phase shifter 222 at the peak of the RZ optical pulse.

The output light from the phase shifter 220 enters a birefringent medium 232 through a polarization controller 230, transmits a birefringent medium 232 and then enters the optical fiber transmission line. The principal axis of the birefringent medium 232 is disposed so as to become an angle of 45° to the polarization direction of the output light from the phase modulator 220. Generally, the birefringent medium 232 itself comprises the polarization dependent loss. The polarization controller 230 can be used to adjust the polarization direction of the signal light so that signal light power is equalized at each polarization axis taking account of the polarization dependent loss of the birefringent medium 232 and to modify or adjust the power allocation to each polarization axis of the birefringent medium 232. When the polarization direction of the incident light of the birefringent medium 232 is set in advance so that the degree of polarization in the output of the birefringent medium 232 becomes the desired value and maintained, the polarization controller 230 becomes unnecessary. However, the procedure for the posterior changes becomes easier when the birefringent medium 232 is disposed. In the birefringent medium 232, the polarization rotates in the RZ pulse according to the frequency deviation caused by the phase shifter 220. Consequently, the degree of polarization in the RZ optical pulse lowers.

From our later researches, it has proved that the polarization scrambling effect by the birefringent medium 232 decreases and the degree of residual polarization increases if the sign of frequency deviation by the phase modulation of the phase shifter 220 is reversed untimely. Therefore, in this embodiment, the degree of residual polarization can be adjusted by controlling the amount of phase shift of the phase shifter 222. This means that the degree of phase modulation and the degree of residual polarization can be controlled independently.

Figure 9:
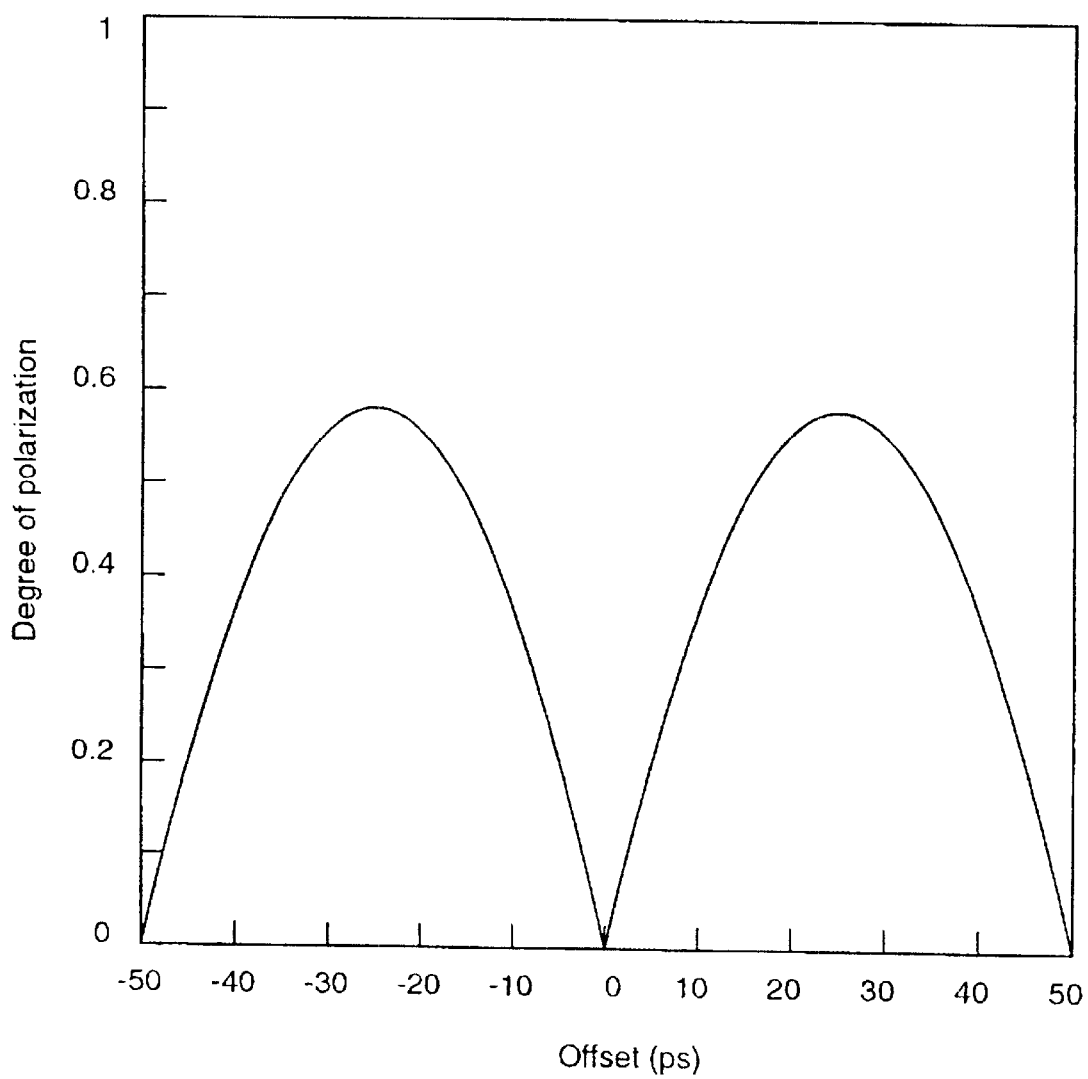
FIG. 9 shows the relation between the delay offset and the degree of polarization at phase modulation.

FIG. 9 shows the result obtained by calculating the change of residual degree of polarization in relation to an offset between the peak of the RZ optical pulse and the timing in which the sign of frequency deviation due to the phase modulation by the phase shifter 220 reverses, on the assumption that the RZ optical pulse to be phase-modulated comprises a Gauss waveform. The ordinate axis indicates the degree of residual polarization and the abscissa axis shows the offset between the peak of the RZ optical pulse and the sign reversal timing of the frequency deviation. When the peak of the RZ optical pulse coincides with the sign reversal timing of the frequency deviation, the more the offset increases, the more the residual degree of polarization deteriorates as far as 0.6 at the maximum even if the residual degree of polarization is zero.

When the RZ optical pulse is a rectangular pulse, if the frequency deviation makes one revolution in a single RZ optical pulse, the polarization also logically makes one revolution in the optical pulse and its residual degree of polarization becomes zero. However, the RZ optical pulse generally is not rectangular and, if anything, close to a Gauss waveform. When the RZ optical pulse comprises such Gauss waveform, in order to make the residual degree of polarization zero, it is necessary that the phase modulation degree by the phase shifter 220 has to be deeper than the degree optimum for the transmission characteristics. However, if the phase modulation degree is too deep, the transmission characteristics inversely deteriorate.

As described in the foregoing, the residual degree of polarization has been considered that the lower it becomes the better it is. However, the test result shows that in the RZ transmission if the phase modulation degree is set optimum for the transmission characteristics, excessive polarization dispersion is needed when the degree of polarization is made to substantially become zero with a polarization mode dispersion medium such as the birefringent medium. On the other hand, in order to scramble the polarization using a birefringent medium of polarization mode dispersion with adequate amount, excessive phase modulation is needed. In both cases, as shown in FIG. 8(*c*), the optical pulse waveform widens and, according to circumstances, the optical pulse splits. This causes the deterioration of transmission characteristics and makes the improvement of transmission rate difficult.

Figure 10:
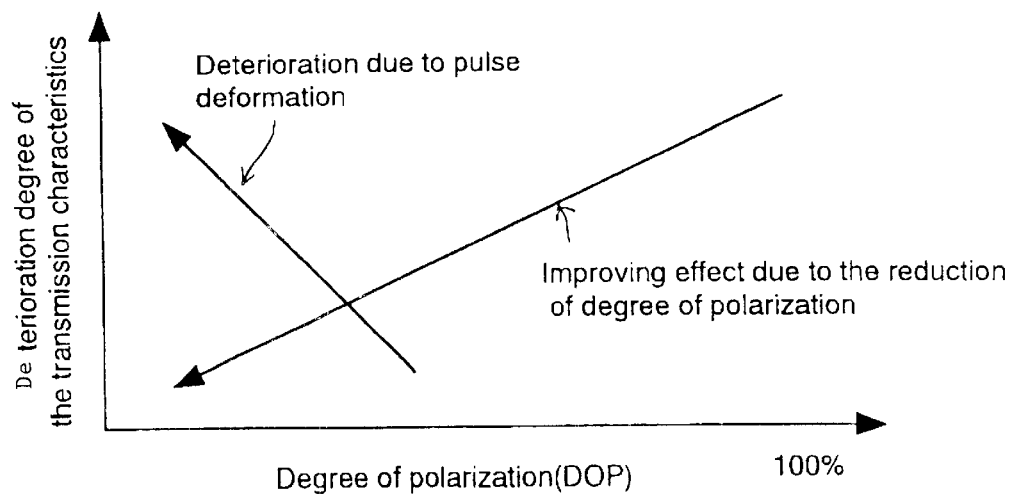
FIG. 10 shows the qualitative variation of the deterioration degree of the transmission characteristics in relation to the degree of polarization.

Qualitatively, the RZ transmission has a tendency as shown in FIG. 10. The abscissa axis and the ordinate axis indicate the residual degree of polarization and the transmission characteristics respectively. In proportion as the degree of polarization decreases, factors for deteriorating the transmission characteristics reduces and affects to improve the transmission characteristics. On the contrary, if the optical pulse is phase-modulated too deeply or a birefringent medium with a large polarization mode dispersion value is used in order to reduce the residual degree of polarization, the optical pulse waveform is deformed (generally, widened) and this causes the deterioration of transmission characteristics. In conclusion, an intermediate degree of polarization is the most preferable.

The transmission characteristics of 10 wavelengths multiplexed and transmitted 9000 km at 10 Gb/s are studied. To put it concretely, a 900-km cyclic transmission experimental system comprising 21 EDFAs pumped with 980 nm, 18 dispersion shift fibers of 45 km span (wavelength dispersion at 1550 nm: approximately −2 ps/km/nm), and 2 dispersion compensating fibers (wavelength dispersion at 1550 nm: approximately 18 ps/km/nm) is made and the transmission characteristics are evaluated after 10 rounds. The zero dispersion wavelength of the cyclic transmission system is set to 1550 nm. 10 signal wavelengths are disposed between 1546 nm and 1554 nm at a wavelength interval of 0.8 nm. The 10 wavelengths are divided in two groups and RZ-modulated at 10 Gb/s per 5 wavelengths in a lump. The wavelengths are then phase-modulated at 10 GHz with the modulation degree of $0.8\pi$. The pulse width of an RZ optical signal is approximately 40 ps and the amount of phase shift of a phase shifter is set so that the frequency deviation becomes zero at the center the optical pulse. The residual dispersion value is dispersion-compensated at terminal station side (a transmitting station or a receiving station) to become approximately 100 ps/nm at a longer wavelength side compared to the zero dispersion wavelength and to become approximately −100 ps/nm at a shorter wavelength side compared to the zero dispersion wavelength.

Figure 11:
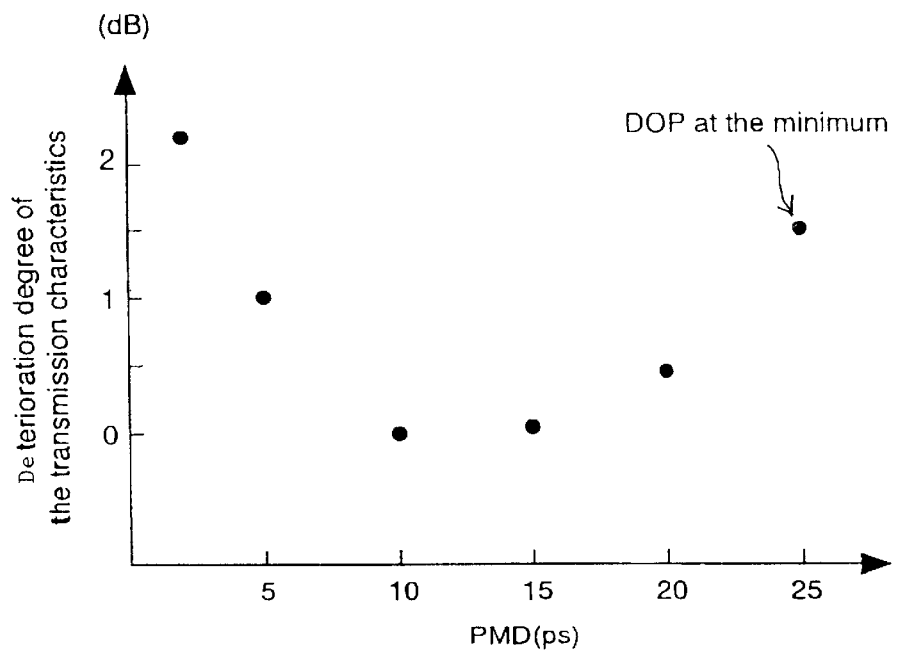
FIG. 11 shows an example of an actually measured deterioration degree of the transmission characteristics in relation to the degree of polarization.
Figure 12:
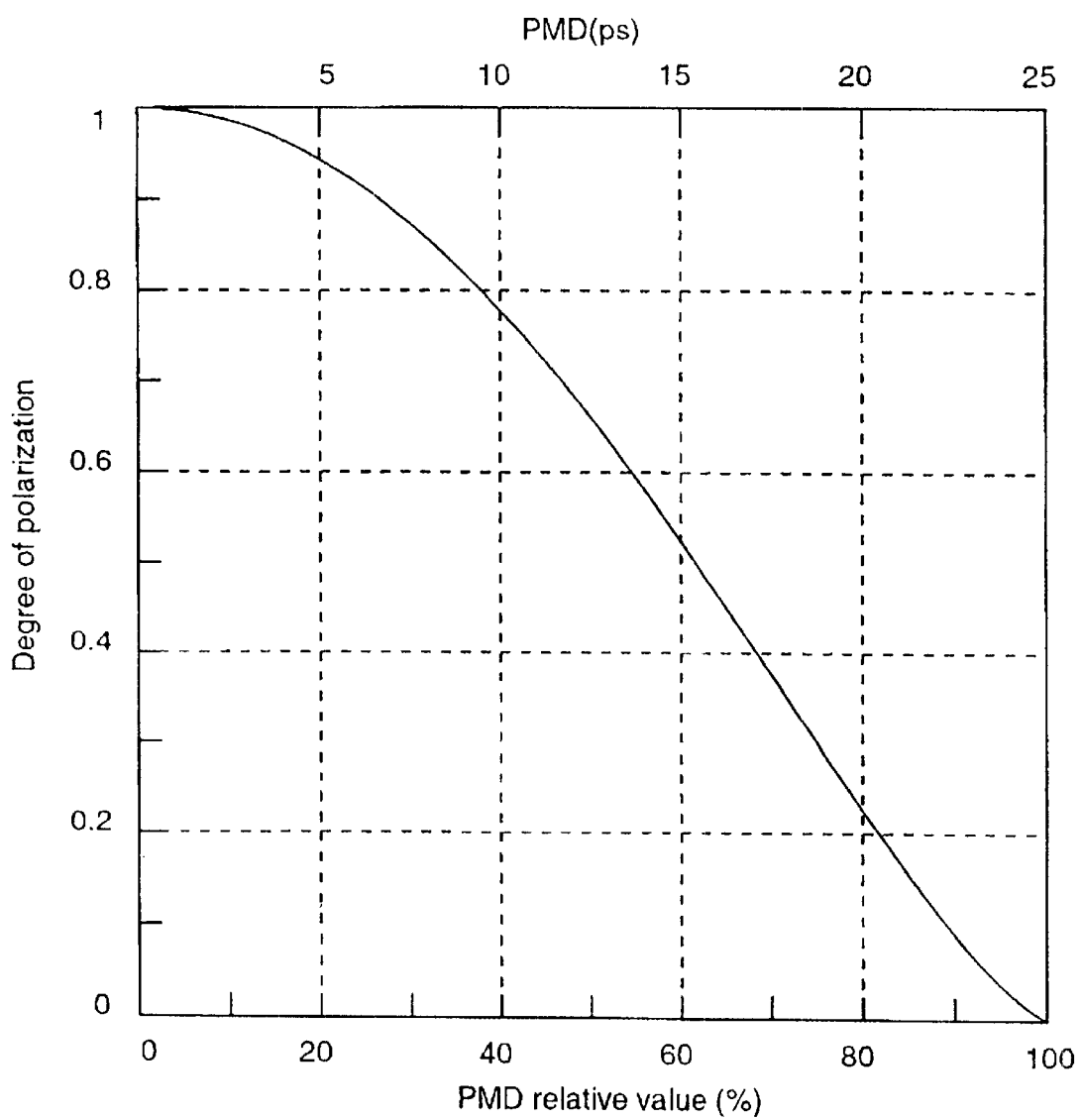
FIG. 12 shows the relation between the degree of polarization and the PMD at the measurement in FIG. 11.

The transmission characteristics are measured by changing the PMD value through changing the length of a crystal of $TiO_2$, which is used as the birefringent medium 232, keeping the amount of frequency deviation due to the phase modulation of the data-modulated RZ signal at a constant value. The observed results are shown in FIG. 11. The polarization DOP becomes the minimum when the PMD is 25 ps. The transmission characteristics improved when the PMD is reduced in sequence of 20 ps, 15 ps and 10 ps. When the PMD was reduced more, the degree of polarization increases and the transmission characteristics deteriorates. The residual degree of polarization was from 20% to 70% when the PMD is from 20 to 10 ps. FIG. 12 shows the relation between the polarization and the PMD. The ordinate axis indicates the degree of polarization DOP and the abscissa axis indicates the relative value and the absolute value of the PMD.

In the embodiment shown in FIG. 7, although the RZ pulse train is formed from the CW light at the single optical modulator 212, it is also applicable that two optical modulators are used and the first optical modulator forms an NRZ optical pulse from a CW light and the second optical modulator forms an RZ optical pulse from the NRZ pulse.

As readily understandable from the foregoing description, according to the invention, phase and polarization can be modulated keeping phase modulation at the optimum state. Furthermore, since a driving signal to be synchronized to a data is not used for polarization modulation, a low-priced and highly reliable optical transmitting apparatus can be realized.

According to the invention, a more miniaturized optical transmitting apparatus can be realized. As the polarization directions of signal lights of adjacent wavelengths are orthogonal, the number of necessary birefringent mediums can be reduced and also the number of the dispersion compensating mediums can be reduced by half in such cases that dispersion compensation is needed. Those also contribute to the miniaturization of the whole configuration.

Further, the phase modulation and the polarization modulation are set independently, and good transmission characteristics in RZ optical transmission is achieved.

While the invention has been described with reference to the specific embodiment, it will be apparent to those skilled in the art that various changes and modifications can be made to the specific embodiment without departing from the spirit and scope of the invention as defined in the claims.

What is claimed is:

1. An optical transmitting apparatus comprising:
    a signal light generator for generating RZ pulse signal light to carry data to be transmitted;
    a phase modulator for phase-modulating the RZ pulse signal light in synchronization with the RZ pulse signal light so that a sign of frequency deviation of the RZ pulse signal light reverses according to a rising part or a falling part; and
    a birefringent medium disposed so that output light of the phase modulator enters substantially at an angle of 45° to a principal axis.

2. The optical transmitting apparatus of claim 1 wherein the birefringent medium comprises a polarization-preserving fiber.

3. An optical transmitting apparatus comprising:
    a signal light generator for generating a signal light pulsed according to data to be transmitted;
    a traveling wave type phase modulator composed of a birefringent medium having slow and fast axes, wherein RZ pulse signal light from the signal light generator enters at a parallel polarization direction with either of the slow or fast axes, propagates in a first direction, modulates a phase of light propagating in the first direction, and functions as a polarization mode dispersion element for light propagating in a second direction opposite to the first direction;
    a reflector/polarization rotator for reflecting the signal light phase-modulated by the phase modulator back to the phase modulator, and rotating a polarization direction of the phase-modulated signal light at an angle of 45° to a principal axis of the phase modulator; and
    a signal light picker for picking up the light reflected by the reflector/polarization rotator and transmitted by the phase modulator.

4. The optical transmitting apparatus of claim 3 wherein the reflector/polarization rotator comprises a polarization-rotating element for rotating the polarization direction of the phase-modulated signal light at an angle of 22.5° in one direction and a reflection mirror.

5. The optical transmitting apparatus of claim 3 wherein the signal light picker comprises an optical circulator disposed between the signal light generator and the phase modulator.

6. The optical transmitting apparatus of claim 3 wherein the phase modulator comprises a crystal of $LiNbO_3$.

7. An optical transmitting apparatus comprising:
    a first signal light generator for generating first RZ pulse signal light having a first wavelength pulsed according to first data to be transmitted;
    a first phase-modulator for phase-modulating the first RZ pulse signal light in synchronization with the first RZ pulse signal light so that a sign of frequency deviation of the first RZ pulse signal light reverses according to a rising part or a falling part;
    a second signal light generator for generating second RZ pulse signal light having a second wavelength pulsed according to second data to be transmitted;
    a second phase modulator for phase-modulating the second RZ pulse signal light in synchronization with the second RZ pulse signal light so that a sign of frequency deviation of the second RZ pulse signal light reverses according to a rising part or a falling part;

a polarization combiner for combining output lights from the first and second phase modulators at an orthogonal polarization direction; and a birefringent medium disposed so that output light of the polarization combiner enters substantially at an angle of 45° to a principal axis.

8. The optical transmitting apparatus of claim 7 further comprising a chromatic dispersion medium for imparting a predetermining chromatic dispersion to output light of the birefringent medium.

9. An optical transmitting apparatus comprising:

first and second pluralities of signal light generators, each of the signal light generators generating signal light with a wavelength different from one another, each signal light being pulsed according to data to be transmitted;

a first plurality of phase modulators each for phase-modulating output light from a respective one of the first plurality of signal light generators, and a second plurality of phase modulators each for phase-modulating output light from a respective one of the second plurality of signal light generators;

a first polarization-preserving combiner for combining output lights from the first plurality of phase modulators in a same polarization direction;

a second polarization-preserving combiner for combining output lights from the second plurality of phase modulators in a same polarization direction;

a third polarization-preserving combiner for combining output lights from the first and second polarization-preserving combiners at a mutually orthogonal polarization direction; and a birefringent medium disposed so that output light of the third polarization-preserving combiner enters substantially at an angle of 45° to a principal axis.

10. The optical transmitting apparatus of claim 9 wherein each of first and second polarization-preserving combiners comprise a polarization-preserving optical coupler.

11. The optical transmitting apparatus of claim 9 wherein the third polarization-preserving combiner comprises a polarization beam splitter.

12. An optical transmitting apparatus comprising:

a signal light generator for generating an RZ pulse signal light according to data to be transmitted;

a phase modulator for phase-modulating the RZ pulse signal light in synchronization with the RZ pulse signal light; and a polarization modulator for polarization-modulating output light from the phase modulator;

wherein a residual degree of polarization is a non-zero finite value.

13. The optical transmitting apparatus of claim 12 wherein the residual degree of polarization in output light from the polarization modulator is from 20% to 70%.

14. The optical transmitting apparatus of claim 12 wherein the phase modulator comprises a birefringent medium.

15. The optical transmitting apparatus of claim 12 wherein the phase modulator reverses a direction of frequency deviation at near to the peak of the RZ pulse signal light.

16. An optical transmitting apparatus comprising:

a data source for outputting data to be transmitted;

an RZ light source for generating an RZ pulse signal light according to the output data from the data source;

a phase adjuster for adjusting a phase of a clock substantially synchronized to the output data from the data source;

a phase modulator for phase-modulating the RZ pulse signal light in synchronization with the RZ pulse signal light so that a sign of frequency deviation of the RZ pulse signal light reverses according to a rising part or a falling part; and a polarization modulator for modulating a polarization of output light from the phase modulator according to a phase of the output light from the phase modulator.

17. The optical transmitting apparatus of claim 16 wherein the polarization modulator comprises a birefringent medium.

18. The optical transmitting apparatus of claim 16 wherein the polarization modulator comprises a polarization controller for controlling the polarization of the output light from the phase modulator and a birefringent medium disposed so that output light from the polarization controller enters at a predetermined angle to a principal axis.

19. The optical transmitting apparatus of claim 16 wherein a residual degree of polarization in the output light from the polarization modulator is non-zero.

20. The optical transmitting apparatus of claim 19 wherein the residual degree of polarization in the output light from the polarization modulator is from 20% to 70%.

21. The optical transmitting apparatus of claim 16 wherein the phase modulator reverses a direction of frequency deviation at near to the peak of the RZ pulse signal.

22. An optical transmitting apparatus comprising:

a plurality of systems each having,
a first signal light generator for generating first RF pulse signal light having a first wavelength pulsed according to first data to be transmitted,
a first phase modulator for phase modulating the first RZ pulse signal light in synchronization with the first RZ pulse signal light so that a sign of frequency deviation of the first RZ pulse signal light reverses according to a rising part or a falling part,
a second signal light generator for generating second RZ pulse signal light having a second wavelength pulsed according to second data to be transmitted,
a second phase modulator for phase modulating the second RZ pulse signal light in synchronization with the second RZ pulse signal light so that a sign of frequency deviation of the second RZ pulse signal light reverses according to a rising part or a falling part,
a polarization combiner for combining output lights from the first and second phase modulators at an orthogonal polarization direction,
a birefringent medium disposed so that output light of the polarization combiner enters substantially at an angle of 45° to a principle axis, and
a chromatic dispersion medium for imparting a predetermined chromatic dispersion to output light of the birefringent medium; and a wavelength multiplexer for wavelength-multiplexing output light of the chromatic dispersion medium from each of the systems.

23. The optical transmitting apparatus of claim 22 wherein wavelengths of the signal lights from the first and second signal light generators of the respective systems are all different.

* * * * *

UNITED STATES PATENT AND TRADEMARK OFFICE
CERTIFICATE OF CORRECTION

PATENT NO. : 6,459,518 B1
DATED : October 1, 2002
INVENTOR(S) : Masatoshi Suzuki et al.

It is certified that error appears in the above-identified patent and that said Letters Patent is hereby corrected as shown below:

<u>Title page,</u>
Item [75], Inventors, delete all references to "Kamifukuoka-Shi" and replace all with
-- Saitama -- (three occurrences).

<u>Column 13,</u>
Line 56, replace "phase" with -- polarization --.

<u>Column 14,</u>
Line 54, replace "principle" with -- principal --.

Signed and Sealed this

Fifteenth Day of February, 2005

JON W. DUDAS
*Director of the United States Patent and Trademark Office*